March 28, 1967  W. SCHRAUB  3,311,425
GUIDING MEANS FOR MACHINE TOOL PARTS, ESPECIALLY FOR CARRIAGES
Filed March 23, 1964
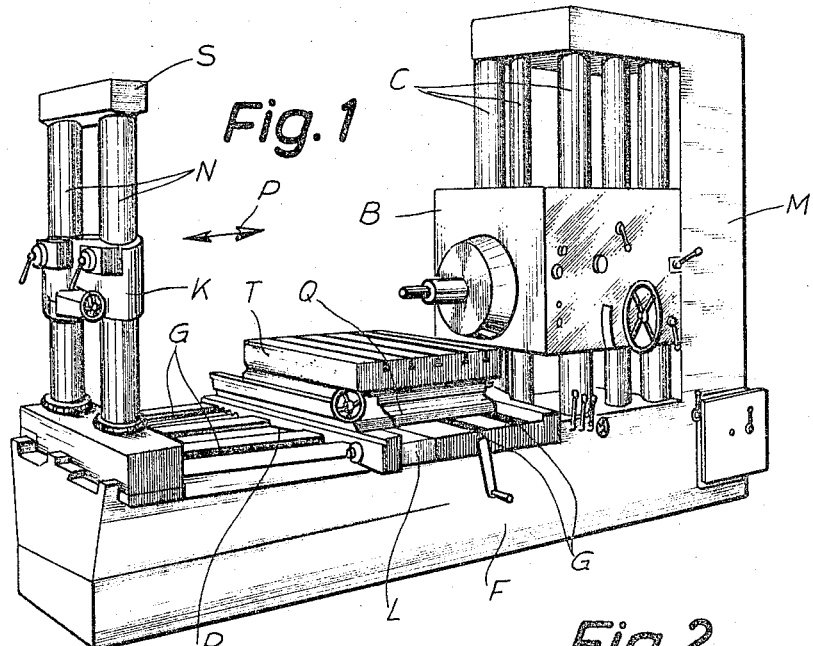
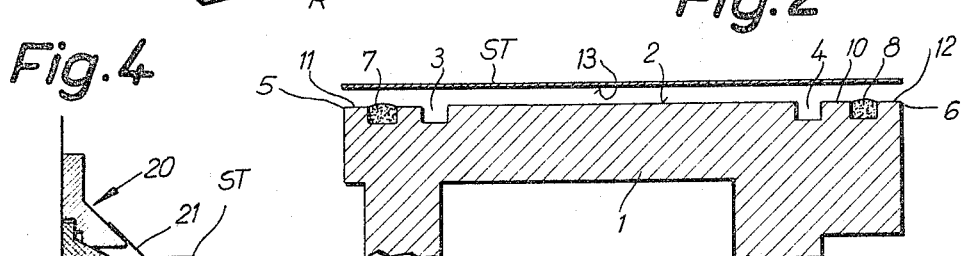
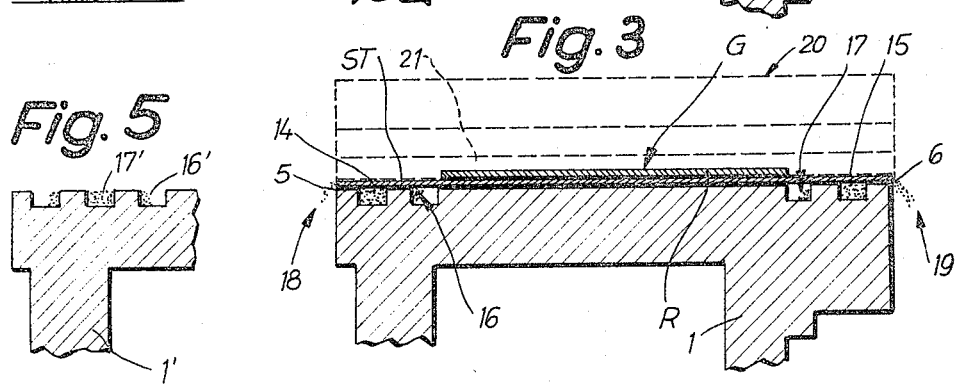
INVENTOR.
Willy Schraub
BY United States Patent Office 3,311,425
Patented Mar. 28, 1967

3,311,425
GUIDING MEANS FOR MACHINE TOOL PARTS,
ESPECIALLY FOR CARRIAGES
Willy Schraub, Beckrath, Wickrath (Niers), Germany, assignor to Scharmann & Co., Rheydt, Rhineland, Germany
Filed Mar. 23, 1964, Ser. No. 353,769
Claims priority, application Germany, July 5, 1963, Sch 33,584
3 Claims. (Cl. 308—3)

The present invention relates to guiding means for machine tool parts, especially for carriages, and also concerns a method of making such guiding means. Guiding means in form of guiding tracks for machine tool parts, especially carriages, are known in which a steel band or strap is clamped over the guiding member and connected thereto. It is on this steel band or strap that the sliding foil of the movable machine part slides, said sliding foil generally being of bronze.

With heretofore known arrangements of such tracks, the steel band is placed directly upon the guiding member and is grasped at its lateral edges by steel strips which, by means of screws are screwed to that portion of the guiding member which extends beyond the width of the steel band.

With this heretofore known arrangement, it is necessary to provide the guiding member with bores for receiving the connecting screws which extend through the lateral steel strip. Furthermore, it has been found that a gap might form between the guiding carriage and the steel strips, and that chips might enter said gap. It has proved difficult fully to cover the said gap so that chips will be prevented from entering the same. Even when employing a stripper, it is difficult to keep the gap free from chips and from oil and drilling emulsions.

It is also known to cement machine parts together.

It is an object of the present invention to provide guiding means for machine tool parts with a steel band or strap which is arranged in taut condition above the guiding member and is connected thereto, while avoiding the drawbacks of heretofore known guiding means of this general type.

It is another object of this invention to provide guiding means as set forth in the preceding paragraph, which will make superfluous a post-grinding or an additional or post-machining of the guiding member or sections of the steel strap.

It is another object of this invention to provide guiding means as set forth in the preceding paragraphs, in which the sliding portion of the movable machine part will at any rate be completely plane.

Still another object of this invention consists in the provision of guiding means which will prevent the collection of chips, oil or drilling emulsions at undesired places.

Still another object of this invention consists in providing a method of making guiding means as set forth above in a simple but highly effective manner.

These and other objects and advantages of the invention will appear more clearly from the following specification in connection with the accompanying drawings, in which:

FIGURE 1 illustrates the arrangement of guiding member according to the present invention in connection with a horizontal drilling or a milling machine;

FIGURE 2 shows the condition of the guiding member and of the steel band prior to the interconnection of both parts;

FIGURE 3 shows the steel band connected to the guiding member;

FIGURE 4 illustrates a stripper of standard design employed in connection with the present invention;

FIGURE 5 shows one side of a modified guiding member.

The above-mentioned objects have been realized according to the present invention by providing the guiding member at its lateral portions with one or more grooves extending in longitudinal direction, and by cementing the lateral edges of the steel band between the grooves and the adjacent side wall portion, in a manner known per se, to the guiding member. The intermediate section of the steel band below the sliding surface of the movable machine part will thus be free from cement substance so that after applying a corrosion protective to the bottom side of the steel band and to the guiding member over the width of the sliding foil of the movable machine part, the band or strip will there directly engage said guiding member. In this way, a completely plane sliding surface of the steel band will be obtained while the space between the band and the guiding member will laterally of said sliding surface be covered completely so that no spaces will be formed in which chips, oil or drilling emulsions could collect. The steel band can easily be kept free from impurities inasmuch as a stripper may work over the entire width of the steel strap.

The distance between the longitudinal grooves or, when employing a plurality of grooves on each longitudinal side of the guiding members, the distance between the inner longitudinal grooves, corresponds to the width of the sliding foil of the movable machine part.

Preferably, each longitudinal side of said guiding members is provided with at least two grooves in which the outer groove is spaced by an equal distance from the longitudinal side of the guiding member and from the inner groove.

When employing the method according to the invention for making such guiding means, provision is made that one groove each of each longitudinal side of the guiding member is provided with a liquid or pasty adhesive extending over the surface of the guiding member. Furthermore, the marginal portions of the steel strap are pressed upon the marginal portions of the guiding member. In this way, the adhesive extending beyond the surface of the guiding member is displaced onto the surface of the guiding member. When provided with a plurality of grooves at each longitudinal side of the guiding member, due to the fact that the outer groove is spaced from the inner groove and from the longitudinal edge of the guiding member by the same distance, a uniform escape path toward both sides of the outer groove is obtained for the adhesive which protrudes beyond the surface of the guiding member. In other words, a uniform distribution of the excessive quantity of adhesive to both sides of the outer groove will be obtained at each longitudinal side of the guiding member and thus there will also be obtained a completely uniform gluing or cementing effect.

As adhesive may be selected substances which have a surface tension by means of which convex liquid surface is formed. These adhesives include also the multiple component adhesives.

Referring now to the drawings in detail, in FIG. 1, it will be noted that the top surface of the box-shaped frame F is provided with tracks G for the longitudinal carriage L, which guiding tracks are arranged between the main standard or column M and the auxiliary standard or column S. A transverse carriage Q is slidably arranged on the longitudinal carriage L, said transverse carriage Q carrying the setting table T. Also, the transverse carriage may be provided with guiding tracks G. The guiding tracks G referred to are composed primarily of guiding support member 1 and steel band or steel strap ST (FIG. 2).

The guiding member 1 has a plane central surface section 2 which is confined by two grooves 3, 4 extending in longitudinal direction of the guiding member 1 near the lateral edges 5 and 6. Between said grooves 3 and 4 and said lateral edges 5 and 6 there are provided further grooves 7 and 8 which are parallel to grooves 3 and 4 and preferably, but not necessarily, have the same cross-section as said grooves 3 and 4. Grooves 3, 7 and 4, 8 near the longitudinal edges 5 and 6 of the guiding member 1 form therebetween a plane supporting surface 9 and 10 respectively which is located at the same level as surface 2. Similar supporting surfaces 11, 12 are provided between the grooves 7 and 8 and the longitudinal edges 5 and 6. Grooves 7 and 8 are filled with a liquid or pasty adhesive, preferably a multiple component adhesive. This adhesive is shown in FIGS. 2 and 3 in grooves 7 and 8. The quantity of adhesive in grooves 7 and 8 is selected so that the free surface of the adhesive has an upwardly directed convex surface. As adhesive may be selected, for instance, Agomet U4, or Agomet E, etc.

After part 2 of the top surface of guiding member 1 and the bottom side 13 of steel band ST has been provided with a corrosion protective over the width between grooves 3 and 4, the steel band ST is pressed upon the guiding member 1. In this way, the steel band will at its lateral edges 14 and 15 press upon the adhesive in grooves 7 and 8 so that the excessive quantity of adhesive, i.e. the adhesive protruding beyond the surfaces 9 to 12, will be displaced laterally whereby the said cement will be uniformly distributed over the surfaces 9 to 12. That portion of the adhesive which is pressed beyond that edge of the surfaces 9 to 12 will pass either into grooves 3, 4 as indicated by the dots at 16, 17 and 18, 19, or over the side edges 5, 6. The intermediate surface section 2 of the guiding member 1 will, however, remain free from adhesive. Thus, the support of the steel band ST by the intermediate portion of the guiding member 1 will not be affected by said application of adhesive. The band will at any rate rest in a plane manner on the guiding member 1 within the said intermediate section.

The thus supported bands form guideways for moveable parts. In FIG. 1 the guideways G on bed F support carriage L, while guideways G on carriage L support carriage Q.

When employing a stripper 20 known per se, as it is illustrated in FIG. 3, connected to the carriage the stripper plate 21 connected to the stripper body will slide over the entire width of the steel band, as shown in FIG. 3 in dash lines. The steel strap ST on which the sliding foil R of the carriage slides will thus be kept free from impurities over its entire surface.

Surface 2, which is that part of the plane top surface of the support member between the innermost grooves 3 and 4, preferably has such a width that it corresponds to that of foil R.

It is, of course, to be understood, that the present invention is, by no means, limited to the particular construction shown in the drawing, but also comprises any modifications within the scope of the appended claims. Thus, the invention is not limited to the guiding tracks alone but also covers the method of making same. It is furthermore to be noted that the term "steel strap" not only covers a straight strap but also a curved one.

Moreover, the strap or band does not necessarily have to be made of steel but can be made also of other metal suitable for the puropose involved.

What I claim is:

1. A guiding arrangement for guiding tracks on machine tools, which includes: a longitudinally extending guiding element, carriage means having one side thereof facing said guiding element, a sliding foil arranged on that side of said carriage means which faces said guiding element, said guiding element having a substantially plane top surface extending in the longitudinal direction of said guiding element and having each of its lateral marginal portions provided with at least two parallel grooves extending in the longitudinal direction of said guiding element, a metallic band resting on said plane surface and extending in the longitudinal direction thereof and having a width in excess of the lateral distance between those sides of the outermost one of said grooves which are adjacent the longitudinal edges of said guiding element, adhesive means filling said outermost grooves and extending therefrom over said plane top surface between the top surface portions respectively located between the outer sides of the innermost ones of said grooves and said longitudinal edges on one hand and those band surface portions on the other hand which are adjacent to and face said last-mentoned top surface portions, said adhesive means firmly connecting said last-mentioned band portions to said last-mentioned top surface portions, the band surface portion facing said top surface portion which is disposed between the innermost ones of said grooves being free of said adhesive, said sliding foil having a width about equal to the lateral spacing of said innermost ones of said grooves and engaging the upper side of said last mentioned band portion.

2. In combination with a movable machine part having a sliding foil at the bottom thereof, a longitudinally extending guiding element having a substantially plane top surface extending in the longitudinal direction of said guiding element and having each of its lateral marginal portions provided with at least two grooves extending in the longitudinal direction of said guiding element, the distance between the innermost ones of said grooves corresponding at least to the width of said sliding foil, a metallic band resting on said plane surface and extending in longitudinal direction thereof, said foil slidably engaging the upper surface of said metallic band, said metallic band having a width in excess of the distance between those sides of said grooves which are adjacent the longitudinal edges of said guiding element, and adhesive means filling at least one groove extending along each lateral marginal portion of said guiding element, each said one groove being located outwardly from the innermost groove along the respective marginal portion of said guiding element, said adhesive also extending between the top surface portions respectively located on opposite sides of said one groove on one hand and those band surface portions on the other hand which are adjacent to and face said last-mentioned top surface portions, said adhesive means firmly connecting said last-mentioned band portions to said last-mentioned top surface portions, said innermost grooves preventing said adhesive from getting between said band and the portion of said top surface disposed between said innermost grooves.

3. A guiding element according to claim 1, in which the groove in each of said marginal portions which is adjacent the respective adjacent lateral edge of said guiding element is spaced from the respective said lateral edge approximately the same distance it is spaced from the respective adjacent groove in the same marginal portion.

References Cited by the Examiner

UNITED STATES PATENTS

| | | | |
|---|---|---|---|
| 1,245,324 | 11/1917 | Droitcour | 308—3 |
| 1,903,865 | 6/1933 | Johnson | 308—3 |
| 2,190,213 | 2/1940 | Meyer | 308—3 |
| 2,707,694 | 5/1955 | Standring | 156—295 |
| 2,919,956 | 1/1960 | Ormsby | 308—3 |
| 3,176,353 | 6/1965 | Pilliod | 156—295 X |

FOREIGN PATENTS 613,196    8/1956    Canada.

MARTIN P. SCHWADRON, *Primary Examiner.*

DAVID J. WILLIAMOWSKY, *Examiner.*

L. L. JOHNSON, *Assistant Examiner.*